United States Patent [19]

Perugini et al.

[11] 4,076,888
[45] Feb. 28, 1978

[54] PROCESS FOR THE PREPARATION OF METALLIC AND/OR METAL-CERAMIC AND/OR CERAMIC SPONGES

[75] Inventors: Giancarlo Perugini, Merano (Bolzano); Enzo Marcaccioli, Perugia, both of Italy

[73] Assignee: Montedison S.p.A., Milan, Italy

[21] Appl. No.: 702,934

[22] Filed: Jul. 6, 1976

[30] Foreign Application Priority Data

Jul. 9, 1975 Italy .................................. 25214/75
Jul. 9, 1975 Italy .................................. 25215/75

[51] Int. Cl.$^2$ ........................... C08J 9/36; C03C 7/00
[52] U.S. Cl. .................................. 428/313; 428/312; 428/315; 428/613; 427/34; 427/227; 427/229; 427/244; 252/477 R; 427/404; 427/419 A; 204/192 R
[58] Field of Search ............... 428/311, 313, 312, 315, 428/308; 427/227, DIG. 9, 244, 243, 247, 34; 264/44; 252/477 R

[56] References Cited

U.S. PATENT DOCUMENTS

| 3,111,396 | 11/1963 | Ball | 264/44 |
| 3,258,363 | 6/1966 | Lieb | 264/29.1 |
| 3,536,480 | 10/1970 | Winkler | 427/202 |
| 3,666,526 | 5/1972 | Ettinger et al. | 428/311 |

FOREIGN PATENT DOCUMENTS 1,295,293 11/1972 United Kingdom ................. 428/312

*Primary Examiner*—Ralph S. Kendall

*Attorney, Agent, or Firm*—Stevens, Davis, Miller & Mosher

[57] ABSTRACT

A process is disclosed for the preparation of a metallic and/or metal-ceramic and/or ceramic sponge with a three-dimensional cellular structure of filiform morphology, starting from a plastic sponge with a three-dimensional cellular structure of filiform morphology, which has been preliminarily metallized while maintaining substantially unaltered the initial geometrical shape, said process being characterized in that said metallized sponge is coated with a metallic and/or metal-ceramic and/or ceramic material, the coating with said metallic and/or metal-ceramic material being carried out by molten-spray deposition, galvanic co-deposition, evaporation under vacuum, or reactive sputtering, while the coating with the ceramic material is carried out by molten-spray deposition, reactive sputtering or chemical vapor deposition. The starting plastic sponge is foamed polyurethane preferably having a number of pores not exceeding 30 pores/inch, and a thickness not exceeding 25 mm. The metal-ceramic material consists essentially of one or more metal components selected from the class consisting of chromium and nickel associated with one or more ceramic compounds selected from the class consisting of $Al_2O_3$, MgO, $ZrO_2$ and $Cr_3C_2$, and the ceramic material is selected from the class consisting of $ZrO_2$, $Al_2O_3$, $MgO\cdot Al_2O_3$, $3Al_2O_3\cdot 2SiO_2$, $CaZrO_3$, $MgZrO_3$, WC, TaC, MoC, TiC, ZrC and $Cr_3C_2$. The sponges per se as well as supporting structures for catalysts in heterogenous catalytic processes are also claimed.

6 Claims, 6 Drawing Figures

PROCESS FOR THE PREPARATION OF METALLIC AND/OR METAL-CERAMIC AND/OR CERAMIC SPONGES

The present invention relates to a process for the preparation of a new type of metallic and/or metal-ceramic and/or ceramic sponge.

The sponges thus obtained are characterized by a three-dimensional cellular structure with a filiform morphology. They show a high permeability to fluids, a very high lightness, and great mechanical resistance.

It has now been found in accordance with the present invention that a sponge with the above-indicated characteristics may be prepared starting from a sponge of plastic material with a three-dimensional cellular structure of filiform morphology, by transforming said sponge into a metallic sponge without however altering its initial geometrical shape, and by finally coating the metallized sponge with a metallic and/or a metal-ceramic and/or a ceramic material.

In fact, it was surprisingly found that the molten-spray technique (preferably that of plasma-spray) allows one to deposit on the metallized sponge of three-dimensional cellular structure any other desired material (metallic, metal-ceramic or ceramic) and that it is possible to deposit the addition materials also in those shadow zones of the three-dimensional cellular structure of the metal sponges which, with the conventional techniques, would not be directly exposed to the original and main projection of the addition material.

The metal-ceramic and/or ceramic sponges obtained by the process of the present invention also thanks to the composition which gradually changes from the metallic or prevailingly metallic character inside, to the external ceramical character, is in no way fragile and may withstand oxidizing and nitriding conditions at a high temperature without thereby losing its mechanical resistance and stability, although the solid filiform morphology is transformed into a hollow filiform morphology, that is a tubular one, owing to the elimination by ablation of the filiform plastic material which originally forms the basic skeleton of said sponge.

Moreover, it has been found that the process of this invention enables one to obtain a sponge with a three-dimensional cellular structure of filiform morphology based on metal carbides. These latter, in fact, may be deposited onto the metallized structure, if desired adopting an intermediate deposition of refractory metal (e.g. tungsten, molybdenum, etc.) or metal-ceramic material.

The coating of the metallized sponge with a metallic and/or metalloceramic material, apart from by the technique of the molten spray, may also be made by means of a technique chosen from amongst electro co-deposition, evaporation under vacuum, and reactive "sputtering".

The ceramic layer, apart from by the technique of the molten spray, may also be deposited by means of a technique chosen between reactive "sputtering" and "chemical vapor deposition" (this latter technique is also called "gas plating").

The present invention thus has for its object a process for the preparation of a metallic and/or metalloceramic and/or ceramic sponge with a three-dimensional cellular structure of filiform morphology, starting from a plastic sponge with a three-dimensional cellular structure of filiform morphology, which has been preliminarly metallized while maintaining unaltered its initial geometrical shape. This process is characterized in that said metallized sponge is coated with a metallic and/or metalloceramic and/or ceramic material, the coating with said metallic and/or metalloceramic material and/or ceramic material being preferably carried out by means of a molten-spray deposition.

This invention will become even more apparent to those skilled in the art with reference to the following more detailed description and to the attached drawings, in which.

Figure 1:
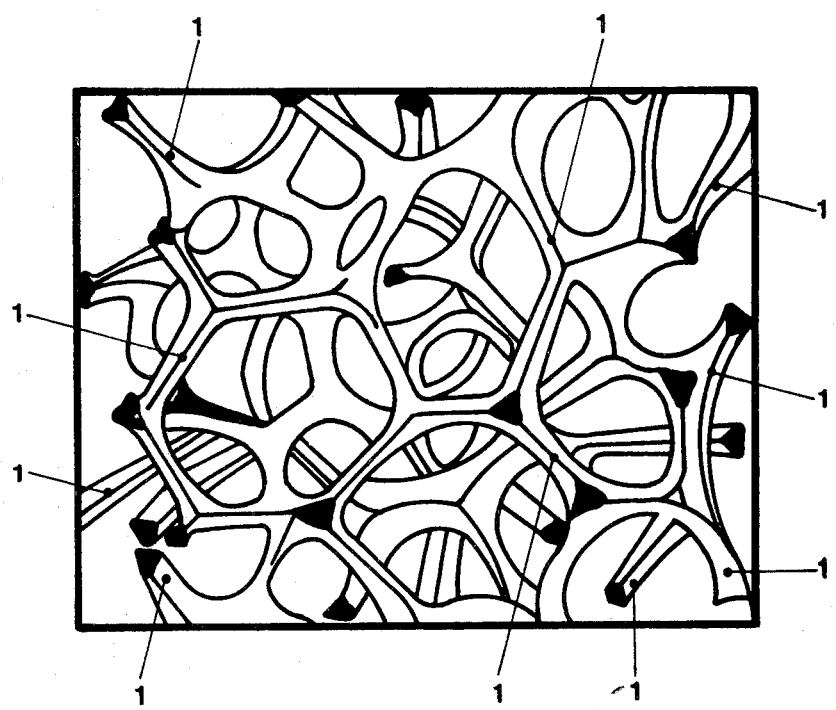
FIG. 1 represents an enlarged view of the open-cell plastic material which is used as starting material for producing the sponge according to this invention.
Figure 4:
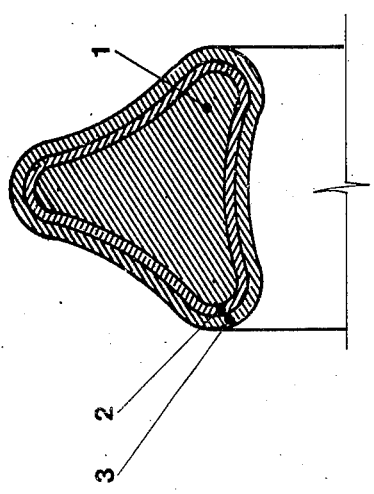
FIG. 4 is a cross-sectional view of the unitary element of FIG. 3, coated with a further, second, metal layer by galvanic or electro deposition or by the plasma-spray technique.
Figure 3:
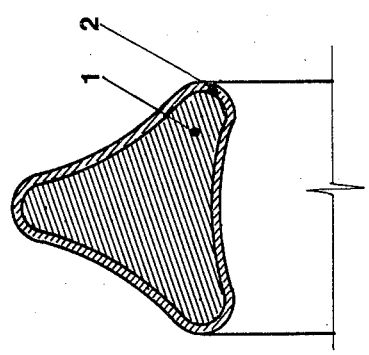
FIG. 3 is a cross-sectional view of the unitary element of FIG. 2, coated with a metal layer deposited by an electroless or similar process.
Figure 2:
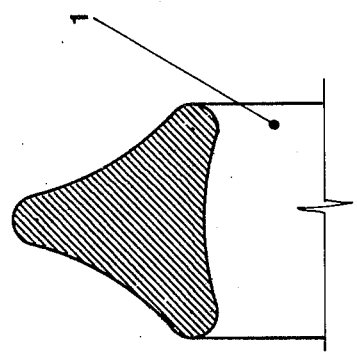
FIG. 2 is a cross-sectional view of one of the filiform unitary elements of the sponge of FIG. 1.
Figure 6:
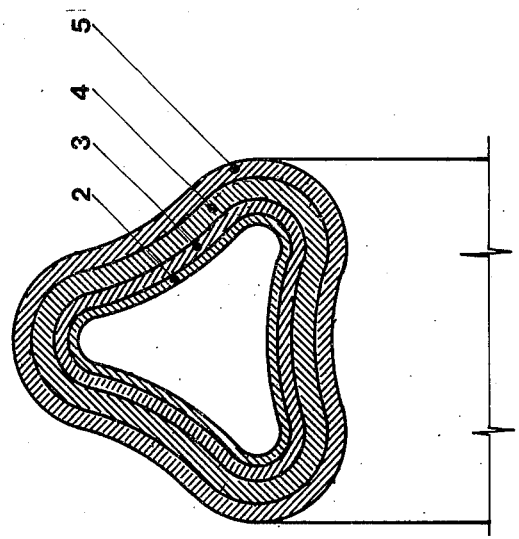
Figure 5:
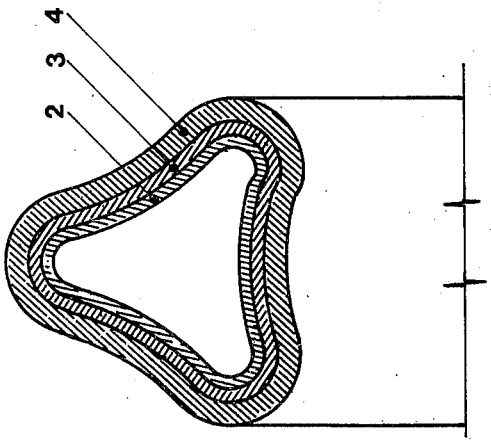

FIG. 5 is a cross-sectional view of the unitary element of FIG. 4, further coated with a third, metal layer and/or metalloceramic layer, by a molten-spray deposition or by galvanic or electro co-deposition or by evaporation under vacuum or by reactive "sputtering"; and FIG. 6 is a cross-sectional view of the unitary element of FIG. 5, further coated with a fourth, ceramic, layer by either molten-spray deposition or reactive "sputtering" or by "chemical vapor deposition".

According to the present invention, the starting material is a sponge with a three-dimensional cellular structure of a filiform morphology, in which unitary elements 1 of FIGS. 1, 2, 3 and 4 form cellular hollows of polyhedric geometry of a more or less large size, which on the whole meet quite well the requisites of relative structural uniformity. This type of sponge has completely open cells, that is, it is without film diaphragms in the various faces of the polyhedric filament forming the hollow cell. In general, as starting materials one prefers to employ a sponge made of a foamed polyurethane, hereinafter sometimes indicated simply by the term "foam" or "foams" for brevity.

Many are the metals which may be deposited as a first film 2 (FIGS. 2, 3, 4, 5, and 6) on the starting sponge. Many of these metals (for instance Ni, Cu, Co, Ag, Au, or Cr) may be deposited either by evaporation under vacuum or by atomic ejection of the "ion plating" type or by an aqueous solution of the electrolyte by an electroless system.

At any rate, it can be said that in general the preferred system involves the deposition of a copper or nickel film by an electroless process.

In this way it is possible to deposit a thickness of metal sufficient for conferring upon the metallized sponge good conductivity characteristics for an electric current.

Still another system suitable for imparting the desired electrical conductivity characteristics is that of applying to the starting sponge a special varnish based on a very fine metal or graphite powder. Such a varnish, after drying, will readily allow the passage of electrical current on or over the surfaces treated therewith.

The plastic sponge thus metallized is capable of conducting an electrical current, and so on it may deposited, by a galvanic or electro process, a second metal layer 3 (FIGS. 4, 5 and 6).

The metals that may be thus deposited on the first metal film 2 include all those that can be deposited by the galvanic or electro process. Preferably there ae doposited galvanically Cu and Ni; the first of these is preferred because of its high thermal conductivity; the second is prefered because of its high mechanical resistance.

The second metallic film 3 (FIGS. 4, 5 and 6), although obtainable also by the plasma-spray technique, is preferably deposited from a galvanic or electroplating bath in the presence or absence of suspensions of ceramic products which, in that case, may be co-deposited.

The thickness of each metal layer deposited on the sponge is sufficient if it is of the order of a few microns in order to withstand without damage the dynamical pressure and the thermal stress due to the projection of the molten-spray. However, greater thicknesses (up to several tens of microns) may be employed if desired.

The layers of metal-ceramic coating 4 (FIGS. 5 and 6) and/or ceramic coatings (FIG. 6) may also be applied directly on the sponge coated with only one layer of mateial 2, that is without the interposition of the intermediate layer of material 3. This presupposes however that the layer of material 2 will then be present in a thickness suited by itself to withstand the treatment connected with the application of the layers of materials 4 and/or 5.

If the layer 4 is metallic and is deposited by means of the technique of the molten-spray, any metal may be used (in the case of easily oxidizable metals, it will be necessary to carry out the molten-spray in an inert atmosphere).

The high-temperature conditions under which the deposition of the coating layers 4 and 5 takes place determine the elimination by ablation of the starting plastic material, whereupon the morphology of the sponge changes from solid filiform to hollow filiform, that is to tubular filiform.

The projection of the molten-spray results in an ensemble of molten particles which may be of different sizes and may have different velocities. The size and velocity of a given molten particle will depend on the type of projecting device used and also on the selected operational conditions. The molten-spray produced by combustion flame is characterized by molten particles that are larger and slower than those obtainable by means of plasma-flames. The molten-spray from plasma-flame differs, moreover, both as regards the projection velocity of the particles as well as for its enthalpy and the flame temperature depending on the plasmogenous gas used. For instance, the flame of an argon plasma has a lower enthalpy and a higher temperature than the flame of a nitrogen plasma, while the latter imparts to the particles a lower velocity.

It has been observed that the smaller the particles of molten material, the more they are subjeft to the diverting action exerted by the vorticosity (or vortical effect) of the flame which is a consequence of the impact with the three-dimensional cellular surface of the substrate, and that in consequence thereof the particles diverted from the original projection-trajectory are capable of hitting and coating also those superficial zones that are located in shadow (i.e., sheltered) positions with respect to the original projection trajectory.

The argon plasma flame has proved to be the best suited of all types of flames for the following reasons:

a. having the highest temperature compared to all the other type of flames, it produces a considerable vapor phase from the overheated particles of molten material;

b. having a lower flame enthalpy, it does not dangerously overheat the three-dimensional cellular strucuture exposed to its projecting action;

c. having the property of chemical inertness, it does not chemically alter the addition material nor the substrate; and d. having a lower velocity and enthalpy, it requires the use of addition materials in the form of powders with a very fine granulometry just as are required for obtaining projections with a high scattering effect of the projection of the molten material, and for getting a high vapor phase mixing effect.

The ceramicization may be realized either in the form of a coating of a refractory oxide preferably selected from a group consisting of $ZrO_2$, $Al_2O_3$, $MgO.Al_2O_3$, $3Al_2O_3.2SiO_2$, $CaZrO_3$ and $MgZrO_3$, or in the form of a refractory carbide coating selected from a group consisting of WC, TaC, MoC, TiC, ZrC and $Cr_3C_2$.

Preferably before ceramicizing (by the deposition of an oxide or a carbide) the metallized sponge, this is first subjected to a coating with a metal-ceramic material which will impart to it refractory and anti-oxidinzing properties and will improve its mechanical resistance characteristics.

Metal-ceramic materials suited for the purpose are those in which one or more metal components (including for instance chromium and nickel) are associated in admixture with one or more ceramic oxides (such as for instance: $Al_2O_3$, MgO, $ZrO_2$, etc.) or with carbides (such as for instance: $Cr_3C_2$).

In order to obtain satisfactory resistance characteristics, it is sufficient to deposit coatings of about 50 um thickness both for the metallic and/or metal-ceramic layer 4 as well as for the ceramic layer 5. Obviously, in the absence of the metal-ceramic layer, it is convenient to bring the thickness of the ceramic layer to at least double this value (i.e. to at least about 100 $\mu$m).

However, is is preferable to produce the ceramic sponge by a preliminary deposition of the metal-ceramic layer.

The powders of materials that are used are preferably in granulometries which are the lowest possible under 50 $\mu$m.

It is convenient that the flame for the molten-spray has the highest possible temperature, and that in the case of the preferred argon plasma flame operational conditions are preferably adopted that are suitable for producing flame temperatures between 10,000° and 15,000° C.

From the macroscopic point of view, the sponges of plastic material that are suited for being treated according to the process of this invention, may have any possible geometrical shape (tubular, cylindrical and/or conical and/or semispherical and/or spherical), provided that the thickness in general is not greater than 12 mm when it is not possible to use the spray on both faces. The thickness may reach 25 mm when the spray projection is applied to on both opposing sides.

The sponges suitable for being treated according to the process of this invention preferably have a number of pores not exceeding 30 per inch. Two preferred porosity values that more particularly illustrate the practical cases of use of the sponges of this invention, are those corresponding to 10 pores/inch (see Examples 1-4) and 20 pores/inch (see Examples 5 to 8).

The sponges obtained by the process of this invention possess, amongst others, the following desirable advantages:

high chemical stability at high temperatures against possible transformations of the metallic materials, such as oxidation, carburizing and nitriding;

high mechanical resistance to high temperatures, a propoerty which, on the contrary, cannot be ensured by ordinary metallic materials, due to oxidation, carburizing and nitriding phenomena; and a good permeability to the flow of fluids to which they are exposed in use.

Thanks to these properties, these sponges turn out to be well suited for being used, for instance, as flame generating baffles for special high-temperature burners, flame guiding baffles for the control of the discharge gases from afterburners of the thermic or catalytic type for motor vehicles, etc.

In particular, the sponges of the present invention may be used as supporting structure for catalysts in heterogeneous catalytic processes wherein it is generally necessary to accurately control the temperature at which the catalysis takes place. In fact, these sponges have thermal exchange characteristic well suited for maintaining the catalyst at a sufficiently uniform temperature and, furthermore, they allow the emplacement of a considerable quantity of catalytic mass in a small volume without thereby creating a hindrance to the flow of the reactants.

By utilizing these sponges as supporting structures for catalysts, the following requirements are furthermore fullfilled:

uniformity of the open-cell structure, with high mechanical resistance;

permeability with a low loss of load by the fluids under particular directional conditions which facilitate the mixing of the components of binary of polynary fluid mixtures, and thus the transfer of the mass;

extended exposed geometrical surfaces as is required for catalyst carriers;

high heat transfer in comparison with the traditional supporting materials for catalysts (diatomite, ordinary ceramic products, etc.); and easy emplacement in and removal from the reaction zone.

Other characteristics and other uses of the sponges of this invention will become even more clearly evident from the following examples:

EXAMPLES 1 to 8

Foamed polyurethane sponges of parallelepiped shape (size: 80×20×10 mm) were treated according to the process of this invention.

In the table that follows there are recorded for each example the porosity of the sponge, the type of plastic material of the starting sponge, the composition of the electroconducting film, of the galvanic coating, and of the applied metal-ceramic and ceramic layers. The numbers in brackets indicate the weights in grams of the starting sponge and of the various applied coatings.

In all the examples of the table, the molten-spray operations both for the metal-ceramic, as well as for the ceramic coating, have been carried out using an argon flame haviing a temperature comprised between 11,000° and 13,000° C and by using powders of the indicated materials with granulometries below 50 μm.

The metal-ceramic coating was obtained from a ternary mixture of 60% Cr, 30% $Al_2O_3$ and 10% Ni.

The table also indicates the total weight of the sponge and its weight after the thermal treatment.

The thermal treatment was carried out keeping the test pieces in a muffle furnace at 900° C for 12 hours in air for Examples 2 to 5, and in nitrogen for Examples 6 to 8. In Example 1 the specimen was not heat-treated.

The advantages offered by the sponges according to this invention have been demonstrated by measuring their resistance to breakage after thermal treatment.

The load was applied to the central part of the sponge disposed horizontally and on the flat side and supported at its ends on a support 5 mm. deep. The load was applied through a knife-like punch with a rounded cutting edge having a radius of curvature of 0.5 mm.

On a metal-ceramic sponge prepared according to Example 3, it is possible for instance to deposit a platinum film chemically or by a physical method (e.g. metallization under vacuum) as well as by a molten-spray projection.

In this way one obtains a sponge useful as filling material in afterburners of the catalytic type for motor vehicles.

TABLE OF EXAMPLES FROM 1 TO 8

| Example | Porosity | METALLIZED SPONGE | | | Molten-spray Coating | | Total Weight of sponge | Weight ofter thermal treatment | Resistance to breakage |
| | | Plastic Material | Electroconducting film | galvanic coating | 1st layer (metal-ceramic) | 2nd Layer (ceramic) | g | g | g |
| --- | --- | --- | --- | --- | --- | --- | --- | --- | --- |
| 1 | 10 pores /inch | foamed polyurethane (0.450) | Ni electroless (0.320) | Ni (1.164) | — | — | 1.934 | — | 340 |
| 2 | | foamed polyurethane (0.426) | Ni electroless (0.313) | Ni (1.102) | — | — | 1.877 | 1.544 | 55 |
| 3 | | foamed polyurethane (0.455) | Ni electroless (0.310) | Ni (1.206) | Cr-Ni-$Al_2O_3$ (2.845) | $ZrO_2$ (3.999) | 8.815 | 9.243 | 1935 |
| 4 | | foamed polyurethane (0.458) | Ni electroless (0.317) | Ni (1.236) | Cr-Ni-$Al_2O_3$ (4.715) | $CaZrO_3$ 2.744) | 9.470 | 10.051 | 1530 |

TABLE OF EXAMPLES FROM 1 TO 8 -continued

| Example | Porosity | METALLIZED SPONGE Plastic Material | Electroconducting film | galvanic coating | Molten-spray Coating 1st layer (metal-ceramic) | 2nd Layer (ceramic) | Total Weight of sponge g | Weight after thermal treatment g | Resistance to breakage g |
|---|---|---|---|---|---|---|---|---|---|
| 5 | 20 | foamed polyurethane (0.431) | electroless Cu (0.076) | Ni (3.449) | Cr-Ni-Al$_2$O$_3$ (14.526) | Al$_2$O$_3$ (5.245) | 23.777 | 24.948 | 9070 |
| 6 | pores | foamed polyurethane (0.438) | electroless Cu (0.075) | Ni (3.583) | Cr-Ni-Al$_2$O$_3$ (12.051) | ZrC (1.689) | 17.836 | 18.775 | 3950 |
| 7 | /inch | foamed polyurethane (0.440) | electroless Cu (0.079) | Ni (3.351) | Cr-Ni-Al$_2$O$_3$ (6.837) | MoC (1.995) | 12.702 | 12.862 | 3590 |
| 8 | | foamed polyurethane (0.428) | electroless Cu (0.070) | Ni (3.369) | Cr-Ni-Al$_2$O$_3$ (10.862) | WC (3.320) | 18.049 | 19.417 | 5940 |

EXAMPLE 9

A sponge according to the present invention, having spread over it catalytic material for ammonia synthesis, was prepared by means of the following phases:

I. Electroless metallization of a foamed polyurethane sponge;
II. Galvanic metallization of the product obtained in (I);
III. Metallization by treating the product obtained in (II) by the molten-spray process;
IV. Coating with a metal oxide by the moltenspray process the product obtained in (III); and
V. Reduction of the metal oxide to the metal.

The procedures adopted for the various phases thus referred to are described hereunder:

Phase I consists of the following steps:

1. degreasing by immersion of the foamed polyurethane in a solution of NaOH of 35% concentration;
2. thorough washing with water;
3. sensitization by immersion in a solution preppared by adding to 1 liter of water 125 cc of concentrated HCl and 25 g of SnCl$_2$.2H$_2$O;
4. thorough washing with water;
5. activation by immersion into an acid solution prepared by adding to 387 cc of distilled water, 10 cc of concentrated HCl and 1 g of palladium;
6. thorough washing with water;
7. electroless metallization by immersion into a solution having the following composition:

| | |
|---|---|
| NiSO$_4$.7H$_2$O | = 20 g/lt |
| NaH$_2$PO$_2$.H$_2$O | = 15 g/lt |
| Pb(NO$_3$)$_2$ | = 5.5 g/lt |
| adipic acid | = 10 g/lt |
| L-ascorbic acid | = 10 g/lt |
| NaOH to pH | = 6 |
| temperature | = 40° C |

Phase II:

The sponge thus nickel-plated was coated with nickel by means of per se conventional galvanic deposition.

The composition of the bath was the following:

| | |
|---|---|
| NiSO$_4$.7H$_2$O | = 330 g/lt |
| NiCl$_2$.6H$_2$O | = 45 g/lt |
| H$_3$BO$_3$ | = 38 g/lt |
| pH | = 1.5 |
| temperature | = 50° C. |

The sponge, removed from the bath, was washed, wiped and dried.

Phase III:

The galvanically nickel-plated sponge was further coated with nickel with a plasma-spray technique by means of a direct current arc device in which the plasma-generating gas was argon.

The plasma-arc conditions were the following:

| | |
|---|---|
| gas arc | 1.5 cu.mt/hr of argon |
| voltage | 35 V. |
| amperage | 600 Amp. |
| gas of the powders | Argon |
| injected powder | technically pure nickel with a granulometry between 29 and 53 μm. |
| distance between anodic nozzle and sponge | 10 cm. |

Phase IV:

This was identical with the preceding phase, except that instead of the Ni there was sprayed an Fe$_3$O$_4$ powder.

Starting from a sponge having a flat rectangular geometry sized 60×34×9 mm roughly, and with a weight of 0.65 g, and having a porosity equal of 20 pores/inch (p.p.i.), there was obtained:
a weight of 0.8 g after phase I;
a weight of 1.7 g after phase II;
a weight of 11.2 g after phase III; and a
a weight of 25.65 g after phase IV.

Phase V:

The sponge thus obtained, with the metal-ceramic structure described, was treated in an oven at 1000° C, in a hydrogen atmosphere for the reduction:

$$Fe_3O_4 + 4 H_2 \rightarrow 3 Fe + 4 H_2O$$

of the magnetite to metal iron, which gave rise to a variation of the molecular volume from 2.1 to 1.0. The volume concentration causes an increase of porosity and thus of the specific surface of the iron that accordingly develops the desired catalytic activity for the ammonia synthesis reaction.

The reduced sponge shows good mechanical resistance, permeability and handling properties together with the property of a good catalytic activity of the reduced Fe spread over the sponge.

EXAMPLE 10

A tubular laboratory reactor (with inside $\phi = 25$ mm), suitably thermostabilized, was loaded with the sponge coated with magnetite prepared according to Example 9.

The magnetite was reduced by feeding in a gas consisting of nitrogen and hydrogen in a molar ratio of 1:3.

The pressure of the system was maintained at 100 kg/cm² while the temperature was gradually raised from room temperture to 300° C.

The course of the reduction was followed by checking the outflowing water in the reaction gases.

Once the water had been exhausted, the catalyst was reduced and the ammonia synthesis reaction started.

The pressure in the reactor was raised to 300 kg/cm² and the temperature was raised to 400° C.

The same mixture of the conventional ammonia synthesis reaction gases was kept feeding in at a space velocity:

$$v = \frac{\text{Normal } m^3/\text{hr mixture}}{\text{cu.mt of apparent volume of catalyst}} = 20{,}000 \ h^{-1}$$

The gas flowing out of the reactor contained a molar percentage of ammonia of 18%.

EXAMPLE 11

In high temperature chemical reactions (whether they are of a purely thermal character or of a catalytic character) a great influence is exerted on the course of the reaction by the mixing factor which should be the highest possible for ensuring the closest possible contact between the various reactants.

This example will show how the sponges of this invention readily allow one to improve the mixing factor so that they may be used as flame-generating baffles for special high temperature burners, as flame-passing baffles for controlling the exhaust gases of after-heaters of thermic or catalytic type of motor vehicles, etc.

Test a: (taken as a referance)

There was used the flame of a Bunsen burner with the air slits or louvers fully open.

The dimensions of the burner nozzle were: $_{extr.}\phi = 11$ mm, $_{int.}\phi = 8.5$ mm.

The gas used for the purpose was methane. The flame obtained had a height of 190 mm with the expansion at $\phi = 13$ mm at a distance from the end of the Bunsen burner of 11 mm. At this distance (11 mm) there resulted a flame section equal to $\pi r^2$, i.e.: $3.14 \times (13/2)^2 = 132.6$ sq. mm Test b:

A ceramic honeycomb structure was prepared by baking paperboards, shaped into the required geometry, and impregnated with a suspension of ceramic products. This structure was prepared with a flat hexagonal geometrical configuration so shaped as to have 19 tubular nozzles of 3 mm diameter each, inserted within a surface delimited by a diameter of 20 mm thereby having a central nozzle surrounded by a series of 6 nozzles arranged on the vertices of a hexagon which in its turn was surrounded by a series of 12 nozzles arranged on the verticies of a dodecagon.

In a ceramic baffle of this type, having a thickness of 11 mm, all the nozzles lie arranged on three straight lines in an equilateral triangle configuration, that is, the baffle shows its 19 nozzles in a flat geometrical arrangement of the hexagonal type with a centered figure.

The baffle thus prepared was placed directly over the Bunsen burner so that the center of the burner coincided with the center of the central nozzle of the nozzle baffle.

The flame of the Bunsen burner, as prepared and described in the preceding Test a, now showed on the upper surface of the baffle from which the flame emerged, an expansion of 20 mm of diameter. That is, it resulted that at the distance of 11 mm from the end of the Bunsen burner the flame showed a flame cross-section equal to:

$3.14 \times (20/2)^2 = 314 \ mm^2$ from which it follows that the interposition of the baffle had caused an expansion of the flame of:

$314/132.6 = 2.368$ times that of preceding instance.

Test c:

A nickel sponge of 10 pores/inch and a thickness of 11 mm was prepared from a foamed polyurethane sponge by deposition of a first layer of copper (about 1 micron) by the electroless process and then a subsequent layer of nickel (about 75 microns) by a galvanic process. The resulting sponge was rested onto the Bunsen burner in a way similar to that indicated in the previous test.

In this case, the flame emerging from the sponge was expanded to a diameter of 35 mm, that is the flame cross-section was now $3.14 \times (35/2)^2 = 961.6 \ mm^2$ from which it follows that the nickel sponge caused an expansion of the flame amounting to:

$961.6/132.6 = 7.25$ times that of the comparative example.

The mixing factor of this nickel sponge was thus seen to be 3 times greater than that of the prior art structure of Test b.

Test d:

A metal-ceramic sponge of 10 pores/inch and a thickness of 11 mm was prepared according to Example 3. The resulting sponge was rested onto the Bunsen burner in a way similar to that indicated in the previous test.

In this case, the flame emerging from the sponge was expanded to a diameter of 40 mm, that is the flame cross-section was $3.14 \times (40/2)^2 = 1256 \ mm^2,$ which means that the metal-ceramic sponge caused an expansion of the flame amounting to:

$1256/132.6 = 9.47$ times that of the comparative example.

The mixing factor of this metal-ceramic sponge was thus seen to be 4 times greater than that of the prior art structure of test b.

EXAMPLE 12

A foamed polyurethane sponge of 20 pores per inch was coated with a first layer of copper by an electroless process. The coated sponge was then subjected to a second coating with Mo, and then to a third coating with $Al_2O_3$ by means of a molten-spray process.

The thus-coated sponge was thereupon introduced into a muffle furnace at 1000° C in an air atmosphere, where it was left to cure for 24 hours under those conditions.

The copper that oxidized was broken up and stripped away by the vapor emissions of the molybdenum oxide which, as is well known, is very volatile. In this way there was obtained a sponge made only of $Al_2O_3$.

A $ZrO_2$ sponge may be obtained by an otherwise similar procedure.

These ceramic sponges offer the great advantage of resisting temperatures higher than those sufferable by the metal sponges first and by the metal-ceramic sponges later on, owing to the fact that the ceramic sponges are made of materials that are more refractory and have a greater chemical inertness.

A $ZrO_2$ sponge may, for instance, be subjected to an oxyacetylene jet at a distance of 20 mm from the top of the burner with the advantage of creating a favorable and thorough mixing between the combustion gases and the air, thus ensuring the desirable result of a more complete combustion.

The metalloceramic as well as the ceramic sponges are particularly suited as filling material for thermal afterburners in motor vehicles.

What is claimed is:

1. A process for the production of metallic and/or metal-ceramic and/or ceramic sponges having a three-dimensional cellular structure of filiform morphology, starting from a foamed polyurethane sponge having a three-dimensional cellular structure of filiform morphology, and previously metallized, said process comprising coating a metallized polyurethane sponge, having a number of pores not exceeding 30 pores/inch and a thickness not exceeding 25 mm, with at least one layer of at least one coating material selected from the class consisting of metal, metal-ceramic and ceramic materials, using a dry high-temperature coating technique consisting essentially of molten-spray deposition by a plasma spray.

2. A process according to claim 1, wherein the outer ceramic layer is in the form of a reducible material so as to provide a porous metal-layer by chemical reduction.

3. A process according to claim 1, wherein the metal-ceramic material consists essentially of one or more metal components selected from the class consisting of chromium and nickel associated with one or more ceramic compounds selected from the class consisting of $Al_2O_3$, $MgO$, $ZrO_2$ and $Cr_3C_2$.

4. A process according to claim 1, wherein the ceramic material is selected from the class consisting of $ZrO_2$, $Al_2O_3$, $MgO.Al_2O_3$, $3Al_2O_3.2SiO_2$, $CaZrO_3$, $MgZrO_3$, WC, TaC, MoC, TiC, ZrC, $Cr_3C_2$.

5. A metallic and/or metal-ceramic and/or ceramic sponge of three-dimensional cellular structure with filiform morphology, when obtained by the process as claimed in claim 1.

6. A supporting structure for catalysts in heterogeneous catalytic processes consisting essentially of a sponge obtained by a process according to claim 1.

* * * * *